(12) United States Patent
Huang

(10) Patent No.: US 7,911,476 B2
(45) Date of Patent: Mar. 22, 2011

(54) MULITMEDIA DATA PROCESSING APPARATUS WITH REDUCED BUFFER SIZE

(75) Inventor: Jing Jung Huang, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 816 days.

(21) Appl. No.: 11/771,634

(22) Filed: Jun. 29, 2007

(65) Prior Publication Data

US 2008/0126621 A1 May 29, 2008

(30) Foreign Application Priority Data

Jun. 29, 2006 (TW) .............................. 95123533 A

(51) Int. Cl.
G06F 13/00 (2006.01)
G06F 13/18 (2006.01)
G06F 3/00 (2006.01)
G06F 5/00 (2006.01)
H04N 11/02 (2006.01)

(52) U.S. Cl. ........ 345/581; 345/535; 345/536; 345/537; 348/384; 348/387; 710/52; 710/53; 710/57; 711/100

(58) Field of Classification Search .................. 345/426, 345/428, 581, 589, 530, 534–535, 536–537, 345/539, 547, 548–549, 545, 555; 348/384, 387, 388, 390, 500; 710/1, 52, 53, 56–57, 58, 61, 118, 308–310, 240; 711/100, 150–151, 168–169, 171, E12.001

See application file for complete search history.

(56) References Cited

U.S. PATENT DOCUMENTS

| 6,778,689 | B1 * | 8/2004 | Aksit et al. ..................... 382/128 |
| 7,266,622 | B2 * | 9/2007 | Flanigan et al. ................. 710/56 |
| 7,373,490 | B2 * | 5/2008 | Bistry et al. .................... 712/245 |
| 2002/0118671 | A1 * | 8/2002 | Staples et al. .................. 370/352 |
| 2003/0113102 | A1 | 6/2003 | Lin |

FOREIGN PATENT DOCUMENTS

TW    I233305    5/2005

\* cited by examiner

*Primary Examiner* — Wesner Sajous
(74) *Attorney, Agent, or Firm* — Thomas, Kayden, Horstemeyer & Risley, LLP

(57) ABSTRACT

A multimedia data processing apparatus with reduced buffer size includes an accessing unit and a data processing module. The accessing unit has a plurality of buffers therein. The data processing module includes a processing unit and a real-time buffer. The processing unit processes the data temporarily stored in the accessing unit and the real-time buffer. By adding the real-time buffer, the size of the buffer in the accessing unit and the maximum bandwidth requirement can be reduced thereby increasing the system performance.

22 Claims, 4 Drawing Sheets

MULITMEDIA DATA PROCESSING APPARATUS WITH REDUCED BUFFER SIZE

CROSS REFERENCE TO RELATED APPLICATION

This application claims the priority benefit of Taiwan Patent Application Serial Number 095123533, filed on Jun. 29, 2006, the full disclosure of which is incorporated herein by reference.

BACKGROUND OF THE INVENTION

1. Field of the Invention

This invention generally relates to a multimedia data processing apparatus with reduced buffer size, and more particularly, to a multimedia data processing apparatus with reduced buffer size for direct memory access in an image system.

2. Description of the Related Art

Referring to FIG. 1, in a conventional image system, a multimedia data processing apparatus 10 includes an accessing unit 11 and a processing unit 12. The accessing unit 11, which can be implemented by a direct memory access (DMA), has a plurality of buffers 111, 112, . . . to 11n therein, which are coupled to a share-bus system 90 through a plurality of channel transmission lines 1, 2, . . . to n having the same number as that of the buffers, whereby respectively transmitting data of color, luminance, subtitle, menu and cursor therebetween. The processing unit 12 performs blending, coding, encoding, scaling and/or de-interlacing of the data stored in the buffers 111, 112, . . . to 11n. FIG. 2 shows a schematic diagram of the operation of a buffer, e.g. buffer 111, in the accessing unit 11, wherein "a" indicates the amount of data temporarily stored in the buffer 111. FIG. 2a shows a schematic diagram of the variation of the amount of data "a", temporarily stored in the buffer 111, in accordance with time, wherein the buffer 111 sends out data (decreasing part of the curve) after receiving data from the share-bus system 90 (increasing part of the curve).

When the share-bus system 90 is utilized as an input of the multimedia data processing apparatus 10, the accessing unit 11 may alleviate burst-type transfer characteristics on the bus. The buffers 111, 112, . . . to 11n in the accessing unit 11 will sequentially send data request packages, as shown in FIG. 2b, to the share-bus system 90 so as to access data therefrom. When the output of the multimedia data processing apparatus 10 is coupled to a real-time device 20, preferably being a sinker such as television, the processing unit 12 combines the data accessed from the buffers 111, 112, . . . to 11n to a real-time image and sends the image to the real-time device 20. In order to have the real-time device 20 extract complete data, the amount of data "a" stored in the buffers 111, 112, . . . to 11n in the accessing unit 11 must maintain a non-empty status during data transmitting. Therefore, each buffer has to extract enough data from the share-bus system 90 each time, i.e. the length of the data in the data request package as shown in FIG. 2b has to be increased, so as to maintain the non-empty status all the time. However, the size of the buffers 111, 112, . . . to 11n will be increased accordingly such that more data can be temporarily stored in the buffers 111, 112, . . . to 11n.

In contrast, when the input of the multimedia data processing apparatus 10 is coupled to the real-time device 20 (source), such as a video camera, and its output is coupled to the share-bus system 90, the amount of data "a" stored in the buffers 111, 112, . . . to 11n of the accessing unit 11 must maintain a non-full status during data transmitting operation such that the real-time device 20 can continuously transmit data. Therefore, the buffers 111, 112, . . . to 11n must have a larger buffer size so as to maintain the non-full status during data transmitting. This will substantially increase the maximum bandwidth requirement, as shown in FIG. 3.

Referring to FIG. 4, when a plurality of the multimedia data processing apparatuses 10 and the real-time devices 20 are concurrently connected to a shared bus 30, an arbiter 40 may arbitrate among the multimedia data processing apparatuses 10 sequentially to access the data stored in a memory 50, e.g. a double data rate memory. In this structure, waiting time of each multimedia data processing apparatus 10 to access data from the memory 50 becomes longer; therefore, in order to have the data "a" stored in the buffers 111, 112, . . . to 11n maintain in the status of non-empty or non-full, the buffers in the accessing unit 11 of the multimedia data processing apparatus 10 must have a larger buffer size so as to meet the bandwidth requirement for the system.

In lights of the above reasons, because the performance of a system depends on the capability to satisfy the entire bandwidth requirement as all modules are turned on, the above mentioned structure of the multimedia data processing apparatuses 10 may decrease the system performance. Therefore, there exists a need for improving the structure of the multimedia data processing apparatuses so as to decrease the buffer size and bandwidth requirement thereby increasing system performance.

SUMMARY OF THE INVENTION

It is an object of the present invention to provide a multimedia data processing apparatus with reduced buffer size, wherein the buffer size in a direct memory access device is reduced by means of adding a real-time buffer in the apparatus.

It is another object of the present invention to provide a multimedia data processing apparatus with reduced buffer size, wherein the maximum bandwidth requirement is reduced and the system performance is increased by means of adding a real-time buffer in the apparatus.

In order to achieve the above objects, a multimedia data processing apparatus with reduced buffer size in accordance with the present invention includes an accessing unit and a data processing module. The accessing unit includes a plurality of buffers therein. The data processing module includes a processing unit and a real-time buffer, and the processing unit is utilized for processing the data temporarily stored in the buffers of the accessing unit and in the real-time buffers. By adding the real-time buffer, the buffer size of the accessing unit and the maximum bandwidth requirement can be reduced thereby increasing the system performance.

BRIEF DESCRIPTION OF THE DRAWINGS

Other objects, advantages, and novel features of the present invention will become more apparent from the following detailed description when taken in conjunction with the accompanying drawings.

FIG. 2a shows a schematic diagram of the variation of the amount of data related to time in the buffer shown in FIG. 2.

FIG. 2b shows a schematic diagram of the data package accessed by the buffer shown in FIG. 2.

DETAILED DESCRIPTION OF THE EMBODIMENTS

Referring now in detail to exemplary embodiments of the present invention, which are illustrated in the accompanying drawings, in which like numerals designate like elements.

Figure 5:
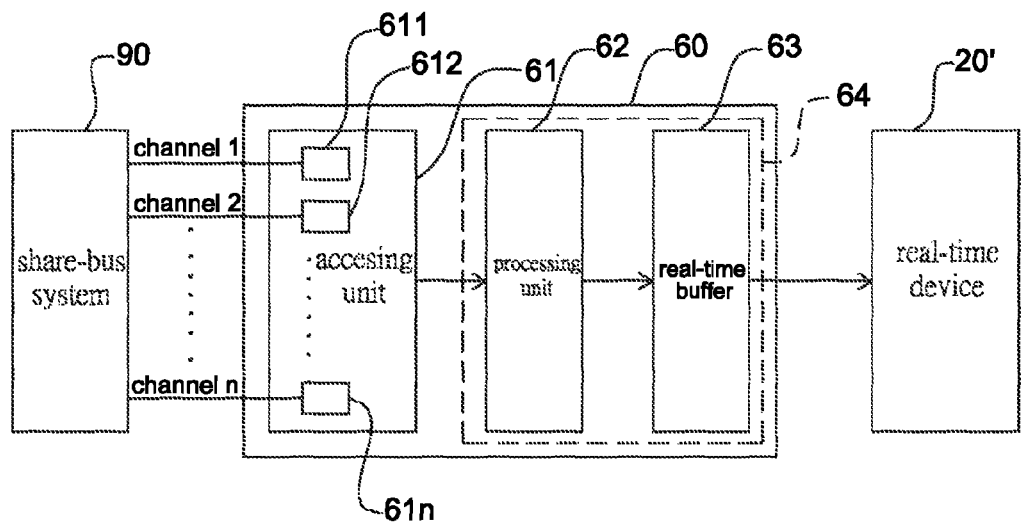
FIG. 5 shows a simplified block diagram of a multimedia data processing apparatus with reduced buffer size according to the first embodiment of the present invention.

Referring to FIG. 5, it illustrates a multimedia data processing apparatus 60 with reduced buffer size according to the first embodiment of the present invention for processing data transmitted between a real-time device 20' and a share-bus system 90. An input of the multimedia data processing apparatus 60 is coupled to the share-bus system 90 and receives data of color, luminance, subtitle, menu and/or cursor. An output of the multimedia data processing apparatus 60 sends out a real-time image to the real-time device 20', and the real-time device 20', in this embodiment, may be implemented by a sinker, e.g. a television.

Referring to FIG. 5 again, the multimedia data processing apparatus 60 in accordance with the first embodiment of the present invention includes an accessing unit 61 and a data processing module 64 which includes a processing unit 62 and a real-time buffer 64. The accessing unit 61 has a plurality of buffers 611, 612, . . . to 61n therein, and the number of the buffers is determined by the data needed to be accessed from the share-bus system 90. The buffers 611, 612, . . . to 61n are coupled to the share-bus system 90 through a plurality of channel transmission lines 1, 2, . . . to n having the same number as that of the buffers so as to access data of color, luminance, subtitle, menu and cursor from the share-bus system 90. The processing unit 62 of the data processing module 64 is utilized for performing blending, decoding, scaling and/or de-interlacing of the data stored in the accessing unit 61, transferring the data to real-time image, and transmitting the real-time image to the real-time buffer 63 of the data processing module 64 to be temporarily stored. The data processing module 64 combines the transmitted data from multiple routes to single route, therefore, the amount of data stored in the real-time buffer 63 is less than that stored in the buffers 611, 612, . . . to 61n of the accessing unit 61.

During operation, at first, the accessing unit 61 sends a reading request to the share-bus system 90; the data to be accessed are sequentially read from the share-bus system 90 and then stored in the buffers 611, 612, . . . to 61n through the channel transmission lines 1, 2, . . . to n. After the processing unit 62 of the data processing module 64 extracts the needed data from the buffers 611, 612, . . . to 61n, the data are processed and sent to the real-time buffer 63 of the data processing module 64 for temporarily storing, and finally the real-time device 20' accesses the needed data from the real-time buffer 63. In this embodiment, because the real-time device 20' has to access data continuously, the amount of data stored in the real-time buffer 63 has to maintain a non-empty status during data transmitting operation. Isolated by the real-time buffer 63, the data stored in the buffers 611, 612, . . . to 61n may be empty temporarily, i.e. each time the amount of data that the accessing unit 61 accessing from the share-bus system 90 need not to be large. Therefore, not only the waiting time of each buffer to access data can be reduced, but also the buffer size of the buffers 611, 612, . . . to 61n and the maximum bandwidth requirement can be decreased, thereby increasing the system performance.

Figure 6:
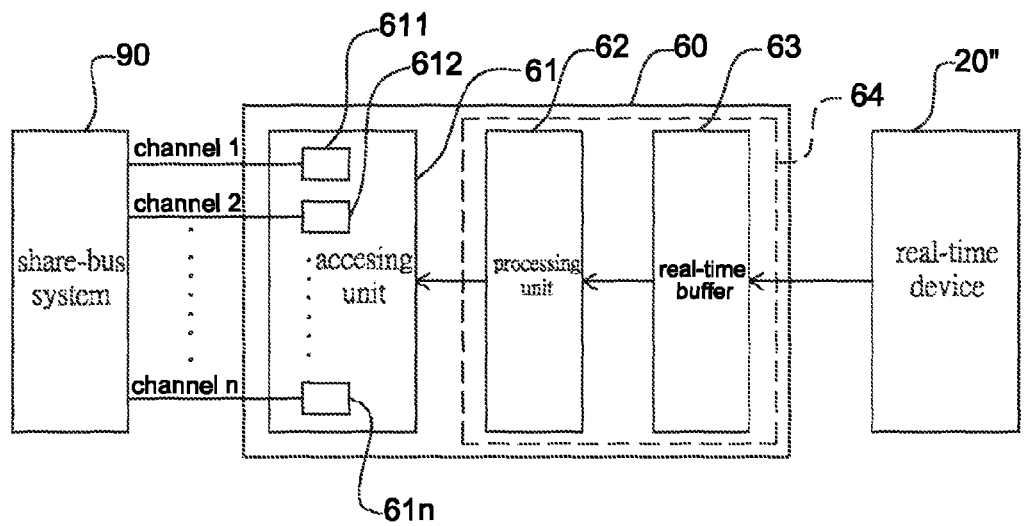
FIG. 6 shows a simplified block diagram of a multimedia data processing apparatus with reduced buffer size according to the second embodiment of the present invention.

Referring to FIG. 6, it shows a multimedia data processing apparatus 60 according to the second embodiment of the present invention for processing the transmitted data between a real-time device 20" and a share-bus system 90. The difference between the second embodiment and the first embodiment is that the input of the multimedia data processing apparatus 60 in the second embodiment receives a real-time image from the real-time device 20", and the output of the multimedia data processing apparatus 60 sends out data of color and/or luminance to the share-bus system 90. The real-time device 20" herein may be implemented by a source, e.g. a video camera.

The multimedia data processing apparatus 60 according to the second embodiment of the present invention includes an accessing unit 61 and a data processing module 64. The data processing module 64 includes a processing unit 62 and a real-time buffer 63. The real-time buffer 63 receives and temporarily stores a real-time image from the real-time device 20". The processing unit 62 is utilized for coding and/or scaling of the data stored in the real-time buffer 63 and for sending out data of color and/or luminance. The accessing unit 61 has a plurality of buffers 611, 612, . . . to 61n therein for receiving and temporarily storing and processing data from the processing unit 62. The buffers are coupled to the share-bus system 90 through a plurality of channel transmission lines 1, 2, . . . to n having the same number as that of the buffers and the data of color and/or luminance are written into the share-bus system 90. The processing unit 62 splits the transmitted data from single route to multiple routes; therefore, the amount of data stored in the buffers 611, 612, . . . to 61n of the accessing unit 61 is larger than that stored in the real-time buffer 63.

During operation, the real-time device 20" sends a real-time image to the real-time buffer 63 to be temporarily stored therein. Then the processing unit 62 processes the real-time image stored in the real-time buffer 63, generates and sends data of color and/or luminance to the buffers 611, 612, . . . to 61n of the accessing unit 61, and then the accessing unit 61 sends a writing request to the share-bus system 90 so as to sequentially write the data of color and/or luminance into the share-bus system 90 through the plurality of channel transmission lines 1, 2, . . . to n. In this embodiment, because the real-time device 20" has to continuously send out data, the amount of data stored in the real-time buffer 63 during the transmitting operation has to maintain a non-full status. Isolated by the real-time buffer 63, the amount of data stored in the buffers 611, 612, . . . to 61n of the accessing unit 61 may be full temporarily, e.g. each time the amount of data that the accessing unit 61 transmitting to the share-bus system 90 need not to be large, therefore, not only the waiting time interval of each buffer to transmit data can be reduced, but also the size of the buffers 611, 612, . . . to 61n and the maximum bandwidth requirement can be decreased, thereby increasing system performance.

Figure 1:
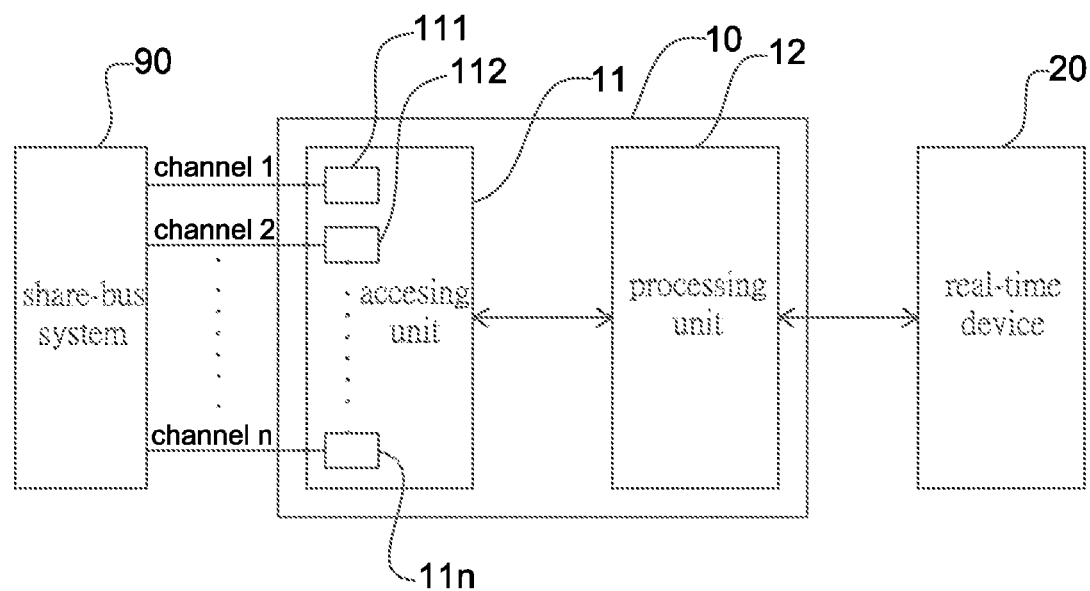
FIG. 1 shows a simplified block diagram of a conventional image system.
Figure 2:
FIG. 2 shows a schematic diagram of the operation of a buffer in the accessing unit of a conventional multimedia data processing apparatus.
Figure 2:
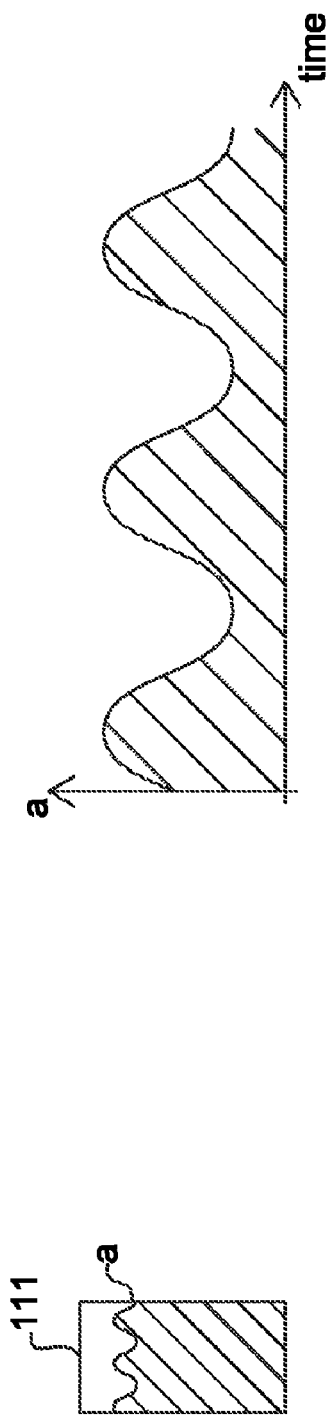
Figure 3:
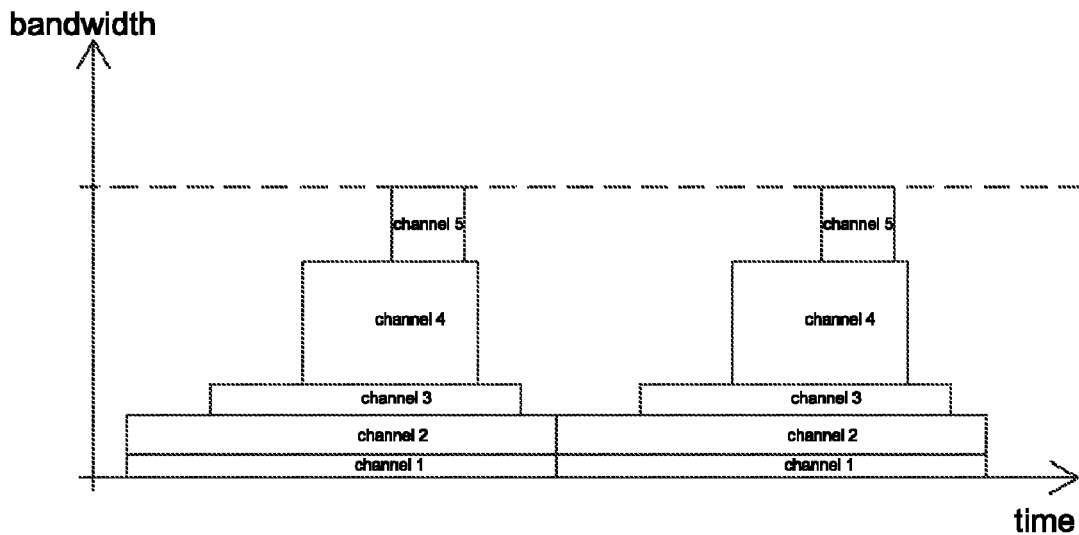
FIG. 3 shows a schematic diagram of the maximum bandwidth requirement of a conventional multimedia data processing apparatus.
Figure 4:
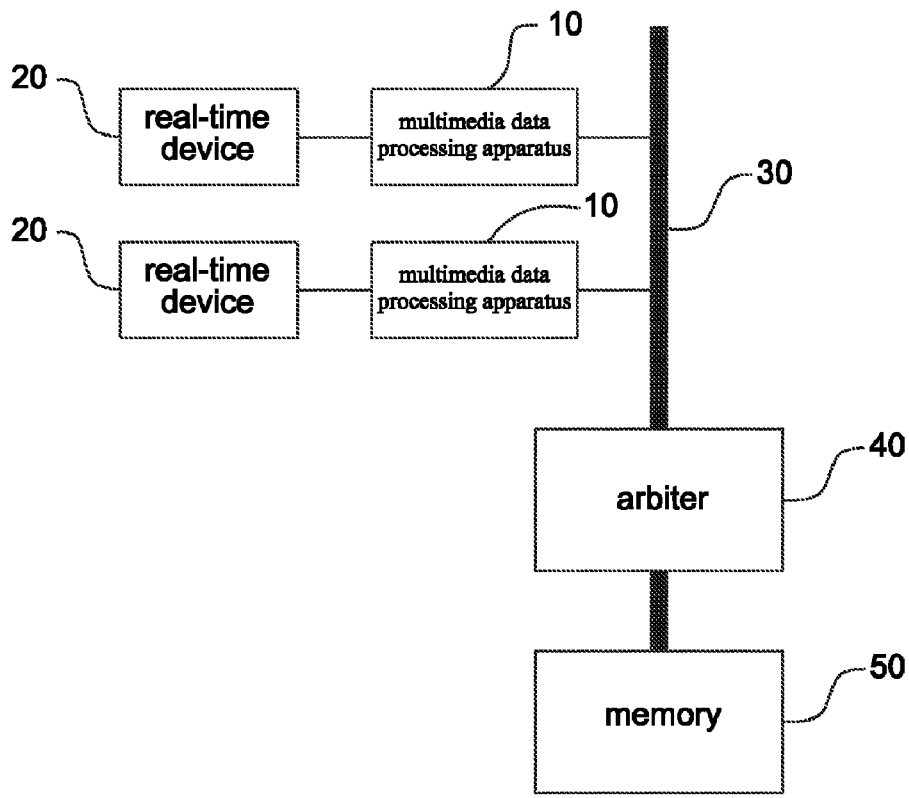
FIG. 4 shows a simplified block diagram of a plurality of conventional multimedia data processing apparatuses coupled to a shared bus.

As explained above, the conventional multimedia data processing apparatus 10, as shown in FIG. 1, has the problem of requiring larger buffer size, and this may increase the maximum bandwidth requirement thereby decreasing the system performance. Compared with the multimedia data processing apparatus 10, the multimedia data processing apparatus in accordance with the present invention, as shown in FIGS. 5 and 6, can reduce the buffer size and maximum bandwidth requirement by means of adding a real-time buffer 63 therein thereby increasing the system performance.

Although the invention has been explained in relation to its preferred embodiments, it is not used to limit the invention. It is to be understood that many other possible modifications and variations can be made by those skilled in the art without departing from the spirit and scope of the invention as hereinafter claimed.

What is claimed is:

1. A multimedia data processing apparatus, comprising:
   an accessing unit further comprising a plurality of buffers therein for temporarily storing first data; and
   a data processing module coupled to the accessing unit, including:
      a processing unit for processing the first data and generating second data; and
      a real-time buffer, coupled to the processing unit, for storing the second data;
   wherein the amount of data stored in the real-time buffer is non-empty when the multimedia data processing apparatus is under data transmitting status.

2. The multimedia data processing apparatus as claimed in claim 1, wherein the first data includes color, luminance, subtitle, menu or cursor data.

3. The multimedia data processing apparatus as claimed in claim 1, wherein the second data are real-time image data.

4. The multimedia data processing apparatus as claimed in claim 1, wherein the processing unit is configured to perform blending, decoding, scaling or de-interlacing.

5. The multimedia data processing apparatus as claimed in claim 1, wherein the second data stored in the real-time buffer is configured to be output to a real-time device.

6. The multimedia data processing apparatus as claimed in claim 5, wherein the real-time device is a data sink.

7. The multimedia data processing apparatus as claimed in claim 1, wherein the amount of the second data is less than that of the first data.

8. The multimedia data processing apparatus as claimed in claim 1, wherein the amount of data stored in at least one of the plurality of buffers is configured to be temporarily empty when the real-time buffer is non-empty.

9. A multimedia data processing apparatus, comprising:
   a data processing module, further comprising:
      a real-time buffer for temporarily storing first data;
      a processing unit, coupled to the real-time buffer, for processing the first data and generating second data; and
      an accessing unit, coupled to the data processing module, comprising a plurality of buffers therein for temporarily storing the second data;
   wherein the amount of data stored in the real-time buffer is non-full when the multimedia data processing apparatus is under data transmitting status.

10. The multimedia data processing apparatus as claimed in claim 9, wherein the first data are real-time image data.

11. The multimedia data processing apparatus as claimed in claim 9, wherein the second data includes color or luminance data.

12. The multimedia data processing apparatus as claimed in claim 9, wherein the processing unit is configured to perform encoding or scaling.

13. The multimedia data processing apparatus as claimed in claim 9, further comprising a real-time device configured to forward the first data to the real-time buffer.

14. The multimedia data processing apparatus as claimed in claim 13, wherein the real-time device is a data source.

15. The multimedia data processing apparatus as claimed in claim 9, wherein the amount of the first data is less than that of the second data.

16. The multimedia data processing apparatus as claimed in claim 9, wherein the amount of data stored in at least one of the plurality of buffers is configured to be temporarily full when the real-time buffer is non-full.

17. A multimedia data processing apparatus, comprising:
   an accessing unit comprising a plurality of buffers therein for temporarily storing first data; and
   a data processing module coupled to the accessing unit, further comprising:
      a processing unit for processing the first data and generating second data; and
      a real-time buffer, coupled to the processing unit, for storing the second data;
   wherein an amount of the second data is less than that of the first data.

18. The multimedia data processing apparatus as claimed in claim 17, wherein the first data includes color, luminance, subtitle, menu or cursor data.

19. The multimedia data processing apparatus as claimed in claim 17, wherein the second data are real-time image data.

20. The multimedia data processing apparatus as claimed in claim 17, wherein the processing unit is configured to perform blending, decoding, scaling or de-interlacing.

21. The multimedia data processing apparatus as claimed in claim 17, wherein the second data stored in the real-time buffer is configured to be output to a real-time device.

22. The multimedia data processing apparatus as claimed in claim 21, wherein the real-time device is a data sink.

* * * * *